*(12)* United States Patent
Paczkowski et al.

(10) Patent No.: US 11,456,893 B1
(45) Date of Patent: Sep. 27, 2022

(54) VNF SLICE PORTABILITY

(71) Applicant: T-MOBILE INNOVATIONS LLC, Overland Park, KS (US)

(72) Inventors: Lyle W. Paczkowski, Mission Hills, KS (US); William M. Parsel, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 37 days.

(21) Appl. No.: 17/031,748

(22) Filed: Sep. 24, 2020

(51) Int. Cl.
*H04L 9/32* (2006.01)
*H04L 12/46* (2006.01)
*H04L 9/06* (2006.01)
*G06F 16/13* (2019.01)

(52) U.S. Cl.
CPC ........ *H04L 12/4641* (2013.01); *G06F 16/134* (2019.01); *G06F 16/137* (2019.01); *H04L 9/0643* (2013.01)

(58) Field of Classification Search
CPC . H04L 63/0435; H04L 63/0457; H04L 63/08; H04L 65/4069; H04L 67/42; H04N 21/23476; H04N 21/25816; H04N 21/63345; H04N 7/17318
See application file for complete search history.

(56) References Cited

U.S. PATENT DOCUMENTS

2004/0215963 A1 10/2004 Kaplan
2005/0138110 A1 6/2005 Redlich et al.
2011/0231660 A1* 9/2011 Kanungo ......... H04N 21/63345
  713/168
2013/0080516 A1* 3/2013 Bologh ................ H04L 69/329
  709/203
2020/0008067 A1* 1/2020 Filsfils .................. H04W 48/18

OTHER PUBLICATIONS

Paczkowski, Lyle W., et al., "Use of Semantically Segmented Filenames," filed Feb. 12, 2020, U.S. Appl. No. 16/789,008.
Restriction Requirement dated Mar. 31, 2022, U.S. Appl. No. 16/789,008, filed Feb. 12, 2020.
FAIPP Pre-Interview Communicarion dated Jun. 14, 2022, U.S. Appl. No. 16/789,008, filed Feb. 12, 2020.

* cited by examiner

*Primary Examiner* — Mansour Oveissi
*Assistant Examiner* — David M Oveissi

(57) ABSTRACT

A method of configuring a computing service on a virtual network with a multi-segment filename. The method comprises requesting an encrypted file by an application executing on a computer by providing a hash filename extracted from a multi-segment filename, wherein the multi-segment filename comprises a unique delimiter between each of the segments of the multi-segment filename, wherein each segment comprises one of a hash filename, a plain text instruction, or plain text content. The application organizes a network slice with one or more VNFs from coded instructions in a segment of the multi-segment filename. The application constructs the computing service within the VNF by transferring one or more executables, the data file, and one or more artifacts decrypted from hash filenames saved within the multi-segment filename to the network slice.

19 Claims, 12 Drawing Sheets

VNF SLICE PORTABILITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network function virtualization improves the flexibility of network service and enables mobile communication providers the ability to host a wide variety of customer network needs. Virtualization technology provides a flexible software implementation of network functions using commercial off-the-shelf hardware, for example, general purpose servers, storage, and switches. Network slicing provides the ability to create isolated virtual networks for use by customers. These virtual networks can be configured for the customer's data and software. The network slice virtual environment is configured to be compatible with any type of software or operating system requirement of the customer. Each network slice can be configured with the characteristics needed for each customer. The virtual network can run multiple slices configured with unique characteristics tailored to the specific needs of different customers.

SUMMARY

In an embodiment, a method of configuring a computing service on a communication network is disclosed. The method comprises providing a multi-segment filename to an installation application executing on computer system communicatively connected to a communication network, wherein the multi-segment filename comprises a unique delimiter between each of the segments of the multi-segment filename, wherein each segment contains one or more of a hash filename, a plain text instruction, or a plain text content. The method further comprises requesting an encrypted file content, by an installation application executing on a computer system, by providing the hash filename extracted from one of the segments of a multi-segment filename, receiving, by the installation application, the encrypted file content from a storage server, wherein the storage server is a local server, a remote server, or a server with distributed content. The method further comprises generating a file content, by the installation application, by decrypting the encrypted file content with an encryption key, wherein the encrypted file content is one of an executable, a machine kernel, a data file, a list of artifacts, a password, or a machine code instruction. The method further comprises constructing, by the installation application, the computing service within a communication network by configuring the communication network with plain text instruction and transferring the file content to the communication network.

In another embodiment, a method of storing a configuration of a computing service configured to operate on a portion of a network is disclosed. The method comprises configuring, by an installation application executing on a computer system, a multi-segment filename with a number of file segments, wherein the multi-segment filename comprises a unique delimiter between each of the file segments of the multi-segment filename, wherein the file segment contains a hash filename or a plain text word. The method further comprises determining, by a hash function executing on a computer system, a hash of a file content of an element of a computing service, wherein the hash is a hash filename, wherein the element is one of an executable, a machine instruction, or a data file content. The method further comprises encrypting, by an encryption function executing on the computer system, the file content of the element with an encryption key. The method further comprises writing, by the application, the encrypted file content with the hash filename to a storage server, wherein the storage server is a local server, a remote server, or a server with distributed content. The method further comprises writing, by the application, the hash filename to one of the file segments of a multi-segment filename. The method further comprises writing, by the application, the plain text word to one or more of the file segments of the multi-segment filename, wherein the plain text word comprises one of the plain text instructions or the plain text content.

In yet another embodiment, a method of managing multi-privilege layer access to confidential information imbedded in filenames of electronic files. The method comprises receiving a hash filename of an electronic file by an application executing on a computer system, wherein the hash filename is a hash of a first file content, wherein the first file content is encrypted. The method further comprises receiving, by an application, the encrypted first file content from a server by submitting the hash filename, wherein the hash filename is the filename of the encrypted file, wherein the server is one of a local server, a remote server, or a server with a distributed filesystem. The method further comprises decrypting with a first encryption key, by the application, the encrypted first file content to receive a multi-segment filename, wherein the multi-segment filename comprises a unique delimiter between each of the segments of the multi-segment filename, wherein at least one file segment contains a second hash filename, wherein each segment contains one of a third hash filename, a plain text instruction, or a plain text content. The method further comprises receiving a second encryption key by a first user from a second user by submitting a request for a second access privilege level. The method further comprises generating a second file content by the application by decrypting a second encrypted file content with a second encryption key, wherein the application receives the second encrypted file content from the server by submitting the second hash filename. The method further comprises providing, by the application, a first file content to a first user having a first access privilege level. The method further comprises providing, by the application, a second file content to the first user having the second access privilege level, wherein the second access privilege level is higher than the first access privilege level.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
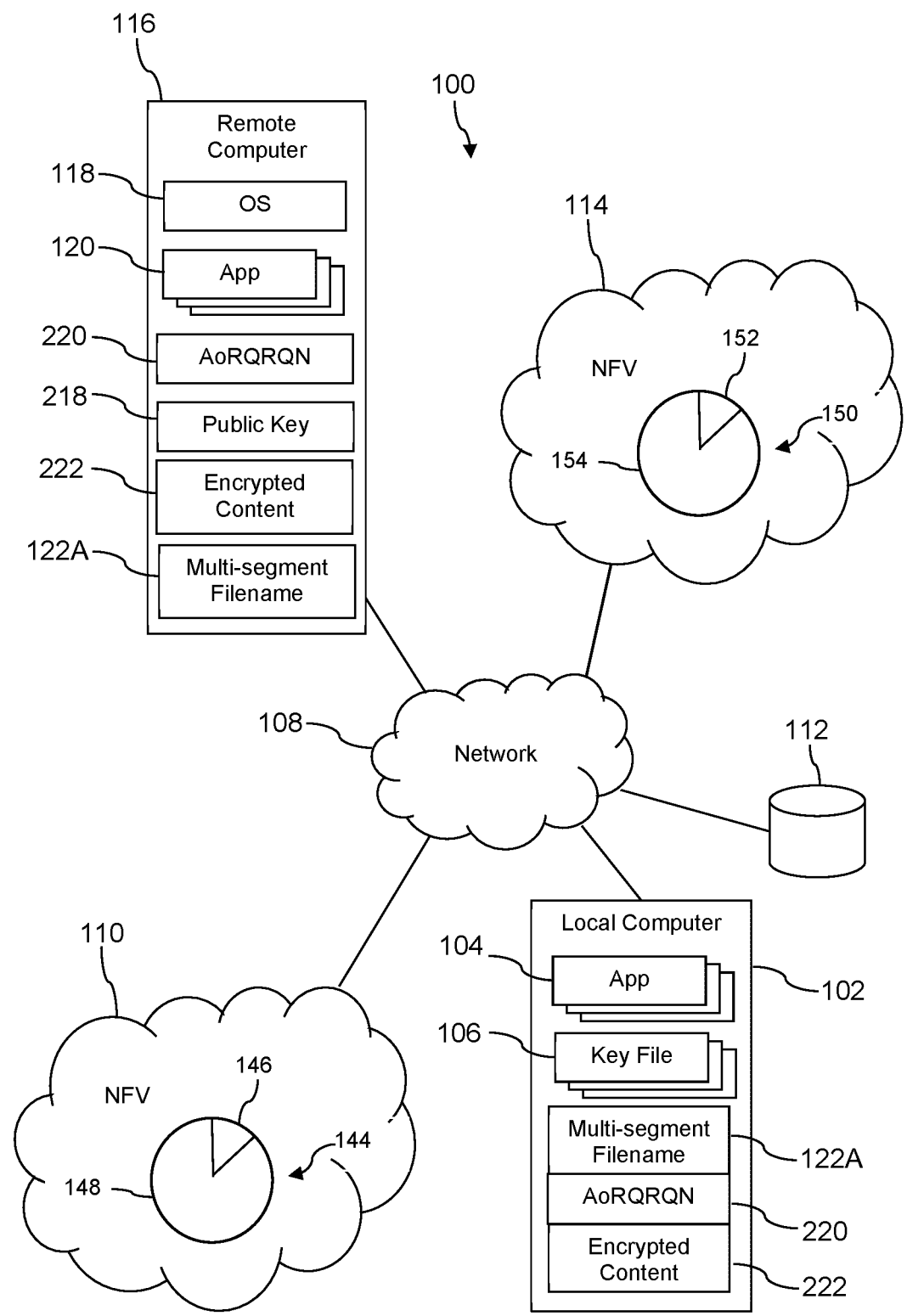
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network function virtualization (NFV) has transformed mobile communication technology by creating an adaptable software-based environment to develop new software solutions for mobile technology challenges. Mobile communication carriers previously relied on expensive proprietary hardware for gates, switches, servers, and storage that was difficult to upgrade and scale-up. NFV creates a virtualized, software-based environment that is built on commodity hardware. Any needed improvement in services or an increase in traffic volume can be created in the virtualized software environment. The NFV virtualized environment can also standardize the services offered regardless of the equipment used because the software is independent of the hardware. The use of NFV allows the mobile communication carrier to develop new products and innovate services independent of the equipment used.

Business customers are requesting computing services on demand from mobile communication carriers. The mobile carriers can now offer computing services such as software services, storage services, and network services based on their customer needs. NFV allows the mobile carriers the ability to offer a wider range of computing and network services because the software virtualization environment can be configured to emulate any platform. A mobile carrier can configure a portion, also called a slice, of an NFV environment to provide a computing service for a business customer. The computing service can be configured on a virtual network function (VNF) within a portion of the slice. A VNF is a software instance in the NFV that consists of the virtualized software running the computing and network processes. However, the configuration of the computing service on the VNF within the network slice can be a daunting task for the service technicians of a local mobile carrier. The problem of configuring a slice can become a reoccurring problem if the business customer requires the computing service periodically (e.g., annually at tax time) or for a specific event (e.g., tracking a hurricane). Discontinuing and re-establishing the computing service can be a time-consuming problem for the service technicians. Transferring the computing service to another location (e.g., another service provider) may also be problematic. For example, a slice configured on a local mobile carrier network must be documented, transferred, and re-established on a second mobile carrier network. A secure transfer may not be possible if the data files and executables have to be transferred through a public network to the second mobile carrier. In addition, the second mobile carrier may require proprietary information for setup and configuration of the slice on the second network.

One solution to establishing a computing service on a slice of a local mobile carrier network utilizes a multi-segmented file name to configure the computing service. The mobile carrier can save the configuration for a computing service to a multi-segment file name. The configuration with the multi-segment file can be used as a backup, can be used to transfer the service to another network and can be used to re-establish a periodic computing service. The multi-segment file name may contain three, four, five, or more file segments with each file segment containing any combination of a filename, a message, instructions, or machine code. An installer application executing on a computer can use the multi-segment filename to create a network slice, organize the virtual network environment, install files, configure the environment, and establish the computing service. The multi-segment filename can have a filename but not the file contents in one or more of the segments. The installer application can retrieve the file content from a remote server where the file content is saved with the same filename. The file content can be one or more files needed for the computing service.

The mobile carrier can save time developing a new computing service for a business customer by modifying a multi-segment filename with an existing configuration of another computing service. For example, a new computing service may use an identical network slice configuration and only need the data file and executable changed for an existing business customer. The mobile carrier may configure a new computing service by copying a multi-segment file name from a similar computing service and changing the files needed for the new computing service. The multi-segment file name can save time and resources by automating the configuration of a computing service on a network slice.

The multi-segment filename can set up a portion of the computing service on the network slice. For example, the multi-segment filename can be used to only configure the network slice and establish a virtual network environment. The computing service can be configured with the files and executables by a second multi-segment filename or another method. Multiple instances of a slice can be configured on a local carrier network with the multi-segment filename. The slice configuration may be saved as a filename, a machine code description, or a set of instructions within one or more segments of the multi-segment filename. In an embodiment, the machine code written into a segment of a multi-segment filename can be translatable by the installer application to create a slice and establish the virtual network function to run the computing service on the NFV. The machine code can contain one or more descriptors of one or more virtual network functions. The machine code can contain instructions to set up a single VNF within a slice or multiple VNFs within a slice. A machine code description of the slice configuration can configure a slice on a local network or can configure a slice on an attached network.

A multi-segment filename also provides a solution to the problem of transferring sensitive file content for a computing service to a second network where security can be a concern. For example, a mobile carrier may contract with a second mobile carrier to provide a network slice for the computing service. The second mobile carrier may be trusted. However, all of the files (including the customer data) may need to be transferred over a portion of a network that is unsecured. The multi-segment filename provides a solution with encryption that prevents any part of the filename from being read without an encryption key. The second mobile carrier may own one or more encryption keys. The second mobile carrier may be able to install a fraction or portion of the computing service before requesting an encryption key from the first mobile carrier. The encryption of the multi-segment filename may include a file content that is encrypted with an encryption key. The filename can be a hash of the file content. The encrypted file can be saved to a remote server with the hash filename. The multi-segment filename may include one or more hash filenames. The installer application can read request the file from the remote server using the hash filename retrieved from one of the segments of the multi-segment filename. The installer application can then decrypt the file content with an encryption key and continue the installation of the computing service. In an embodiment, an installation application executing on the mobile carrier network can unpack the multi-segment filename to create one or more VNFs within a network slice. One segment of the filename can contain the machine instructions for setting up the VNF with the characteristics needed for the computing service. Another segment of the filename can contain a list of artifacts needed for the computing service. Another segment of the filename can include a hash filename to an encrypted file on a remote server that contains one or more executables to perform the functions needed for the computing service. Another segment of the file name can include a hash filename to an encrypted file on a remote server that contains the data of the computing service. Any of the file segments may include a hash filename to an encrypted file content on a local server or remote server. A file segment may contain two or more file hash filenames. In an embodiment, a single multi-segment file name containing all of the files, instructions, and executables can provide the solution for configuring the slice and VNF environment for a computing service to execute on a second mobile carrier network.

In an embodiment, a multilayer encryption method can protect the multi-segment file name used to recreate a computing service on a second mobile carrier network. The multilayer encryption prevents theft of intellectual property, theft of trade secrets, or theft of actual services from a hacker accessing the file. The multi-segment file name with a first encryption layer can be given to a second mobile carrier. The second mobile carrier cannot access the file without the first encryption key. The first encryption key can be owned by the second mobile carrier or can be shared with the second mobile carrier. The first encryption key can unlock a first layer that reveals the multi-segment filename. The second mobile carrier may be able to configure the network slice from the multi-segment filename. One segment of the multi-segment filename can contain machine instructions for the configuration of the VNF within the network slice. A second file segment revealed with the first encryption key can include a list of artifacts needed. A second encryption key may be required to access the remaining files of the multi-segment filename. The second encryption key can be contained within a segment or may be requested from the first mobile carrier network. The second encryption key can reveal an executable file or a binary operating file necessary to run the customer service on the VNF within the network slice. A third encryption key may also be revealed within a file segment of the filename. The third encryption key can reveal the data, a data file, an encapsulation of data, or a location of the data on a remote server. The multilayered encryption of the multi-segment file name provides a solution to protecting the property of a customer and of the first mobile carrier from theft or unwanted access by others.

Turning now to FIG. 1, a system 100 is described. In an embodiment, the system 100 comprises a local computer 102 of a local mobile carrier that comprises one or more applications 104, one or more encryption keys 106, a multi-segment filename 122A, and filename hash identifier 220 in communication with a network 108. The network 108 comprises one or more public networks, one or more private networks, or a combination thereof. The local computer 102 may be communicatively connected to a first network function virtualization (NFV) 110 via the network 108. A remote computer 116 of a remote mobile carrier comprises an operating system 118, one or more applications 120, a public encryption key 218, a multi-segment filename 122A, and filename hash identifier 220. The remote computer 116 can be communicatively connected to a second NFV 114 via the network 108. A remote data storage 112 can be communicatively connected to the network 108. The remote data storage 112 can be a server, a virtual network function, or a data store with a distributed file system. The NFV and computer are described in more detail, further hereinafter.

Figure 2A:
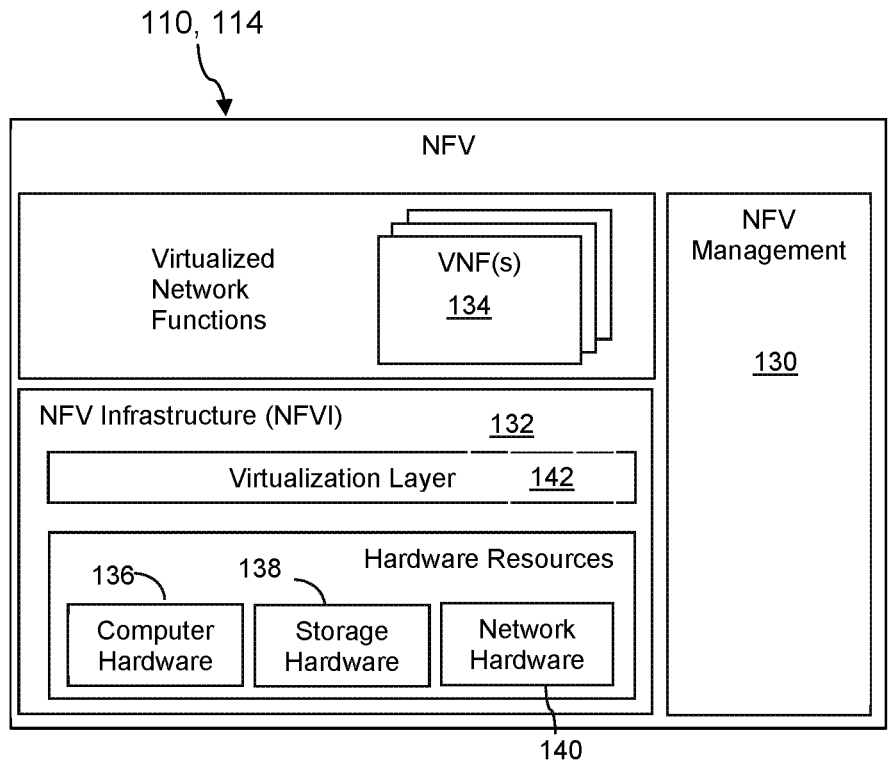
FIG. 2A is a block diagram of a 5G network function virtualization according to an embodiment of the disclosure.

Turning now to FIG. 2A, NFV 110 and NFV 114 are described with the same figure as they are identical in structure. NFV 110 and NFV 114 comprise the NFV management 130, NFV infrastructure 132, and virtualized network functions (VNF) 134. NFV management 130 can control the lifecycle management of one or more VNFs 134. The lifecycle management can include the creation, management, and dissolution of the VNFs 134. The one or more VNFs 134 include the software implementations of a network function that a computing service may execute within. The NFV infrastructure 132 includes computer hardware 136, storage hardware 138, network hardware 140, and a virtualization layer 142. The computer hardware 136 can include single or multiple commercial servers. The storage hardware 138 can include standard hard-drives, solid-state drives, optical storage devices, or any combination thereof. The network hardware 140 can comprise various commercial routers and switch hardware. The virtualization layer 142 decouples the hardware resources (i.e., computing hardware 136, storage hardware 138, and network hardware 140) by abstracting the hardware resources as software functions. The virtualization layer 142 offers standardized interfaces so that the VNF performance can be independent of the hardware resources. The NFV 110 and NFV 114 create a VNF environment that can support computing services regardless of the platform or operating system needed for the computing service. Although NFV 110 and NFV 114 are structurally the same, NFV 110 can have different computer hardware 136, storage hardware 138, and network hardware 140 from NFV 114 and subsequently NFV 110 can have a different computing capacity than NFV 114. Network function virtualization (NFV) is more fully described by ETSI GS NFV 002 v1.2.1 (2014-12) described in more detail further hereinafter.

Figure 2B:
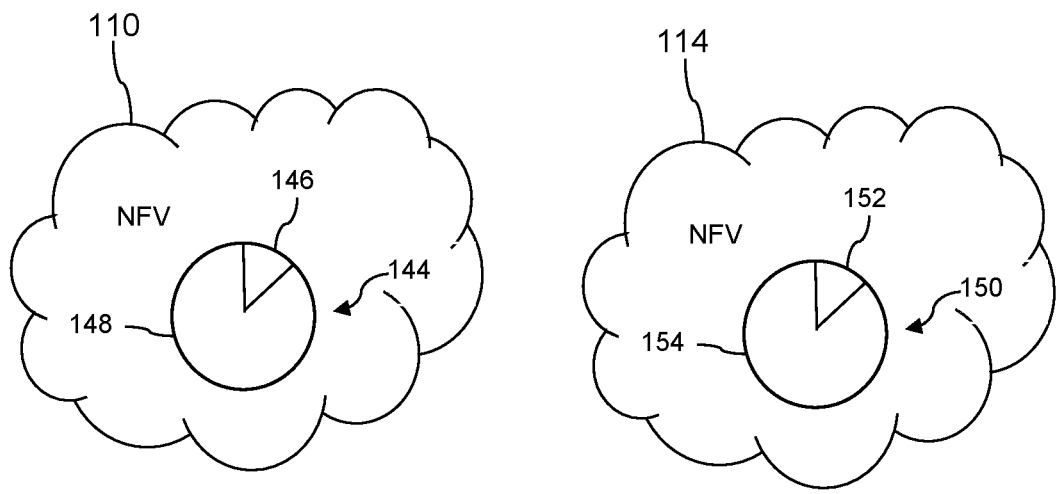
FIG. 2B is an illustration of a network slice from a 5G network function virtualization according to an embodiment of the disclosure.

Turning now to FIG. 2B with reference to FIG. 2A, NFV 110 and NFV 114 are illustrated by a cloud form as NFV 110 and NFV 114 can function as a computing service, a storage service, or a network service depending on the configuration of each VNF. The total volume of computing availability 144 of NFV 110 is illustratively represented by a pie chart with a portion illustrated as slice 146 and the remaining availability 148. The slice 146 represents the computing volume reserved for a customer. The computing volume of the slice 146 can be measured by any combination of the processing capacity of the computing hardware 136 (e.g., CPU capacity), the storage capacity of the storage hardware 138 (e.g., terabytes of data), and the throughput of the network hardware 140 (e.g., link bandwidth). Similarly, the total volume of computing availability 150 of NFV 114 is illustratively represented by a pie chart with slice 152 and the remaining availability 154.

Figure 3A:
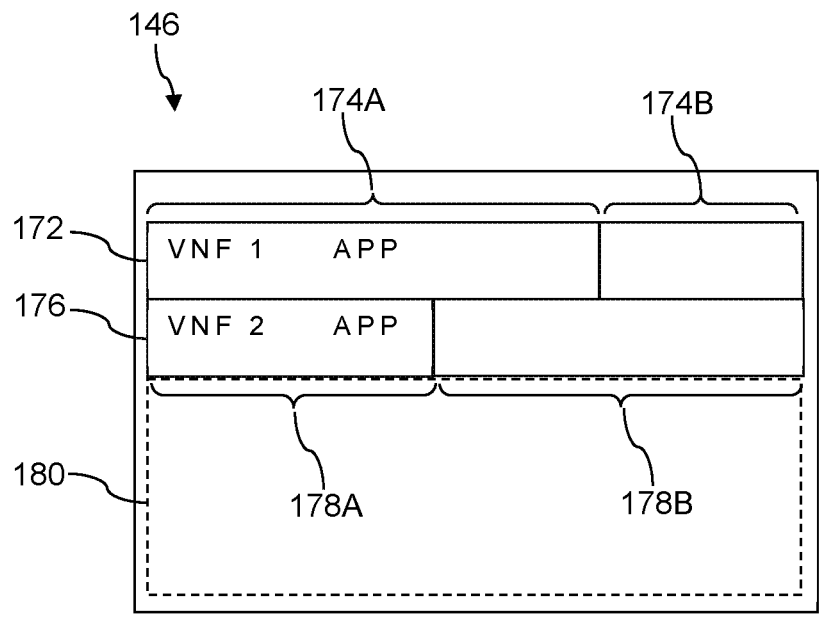
FIG. 3A-B is a block diagram of an application within a virtual network function on a network slice according to an embodiment of the disclosure.

Turning now to FIG. 3A, the computing service executing on slice 146 can comprise a first VNF 172, a second VNF 176, and an unallocated portion 180. The computing service can comprise a first application 174A executing on a first VNF 172 and a second application 178A executing on a second VNF 176. The first application 174A and second application 178A can be computing service applications. The total computing volume can comprise a first VNF 172, a second VNF 176, and an unallocated portion 180. The unallocated portion 180 can represent computing volume reserved by the customer for future use. The first VNF 172 can include a first application 174A and additionally allocated computing volume 174B. The second VNF 176 can include a second application 178A and additionally allocated computing volume 178B. Although two VNFs are illustrated, the slice 146 can have a single VNF, two VNFs, or any number of VNFs. Although the first VNF 172 and second VNF 176 are illustrated with equal computing volumes, it is understood that the computing volumes can be non-equal and can vary depending on the computing volume needs of each application. The first application 174A executing in VNF 172 can be configured to communicate with or share data with the second application 178A executing in the second VNF 176. The first application 174A and second application 178A can be independent and not share data or communicate with each other. Although the slice 146 is illustrated with two VNFs and an unallocated portion 180, the slice 146 may be configured without an unallocated portion 180. Although only one application, a first application 174A, is described executing within the first VNF 172, two or more applications can be executing within the first VNF 172 and second VNF 176.

Figure 3B:
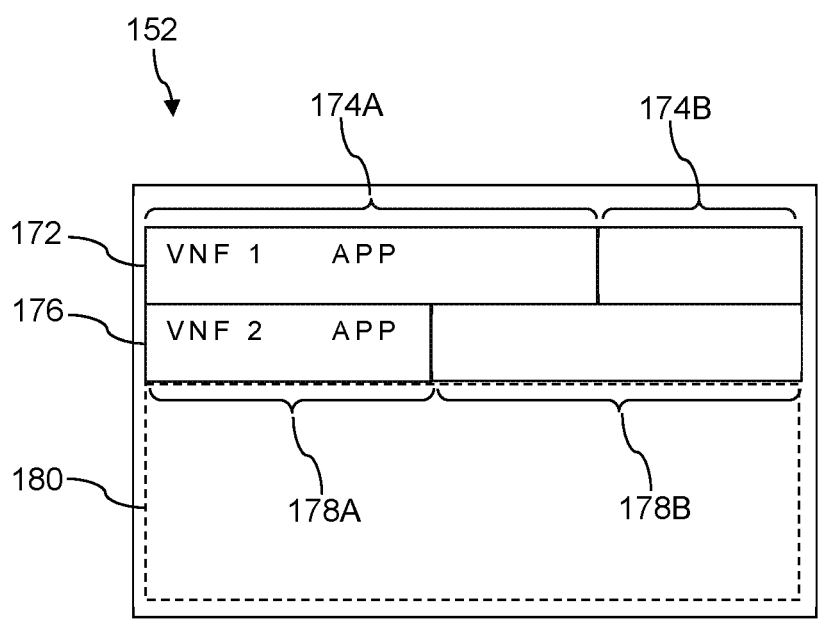

Turning now to FIG. 3B, the slice 152 can comprise a first VNF 172, a second VNF 176, and an unallocated portion 180. The slice 152 has the same configuration, the same allocation, and the same components as slice 146 shown in FIG. 3A.

Figure 4A:
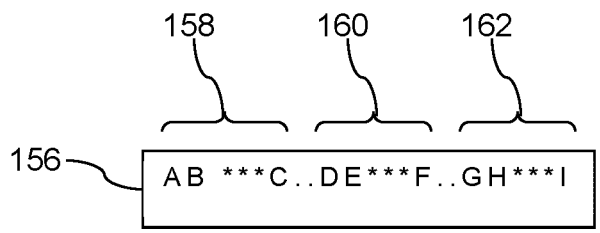
FIG. 4A is an illustration of a first multi-partition filename format according to an embodiment of the disclosure.
Figure 4B:
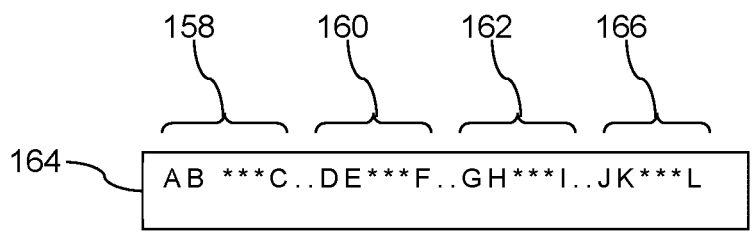
FIG. 4B is an illustration of a second multi-partition filename format according to an embodiment of the disclosure.
Figure 4C:
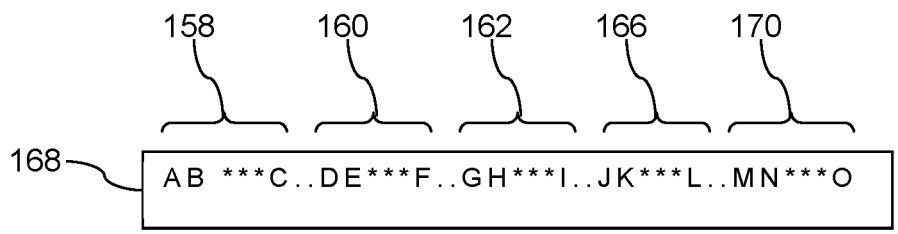
FIG. 4C is an illustration of a third multi-partition filename format according to an embodiment of the disclosure.

Turning now to FIG. 4A, a first multi-segment filename format 156 is described. The first multi-segment filename format 156 comprises a first field or segment 158, a second field or segment 160, and a third field or segment 162. In the first multi-segment filename format 156, the first segment 158 is separated from the second segment 160 by two dots ('..'), and the second segment 160 is separated from the third segment 162 by two dots ('..'). Turning now to FIG. 4B, a second multi-segment filename format 164 is described. The second multi-segment filename format 164 comprises the first field or segment 158, the second field or segment 160, the third field or segment 162, and a fourth field or segment 166. In the second multi-segment filename format 164, the first segment 158 is separated from the second segment 160 by two dots ('..'), the second segment 160 is separated from the third segment 162 by two dots ('..'), and the third segment 162 is separated from the fourth segment 166 by two dots ('..'). Turning now to FIG. 4C, a third multi-segment filename format 168 is described. The third multi-segment filename format 168 comprises the first field or segment 158, the second field or segment 160, the third field or segment 162, the fourth field or segment 166, and a fifth field or segment 170. In the third format 168, the first segment 158 is separated from the second segment 160 by two dots ('..'), the second segment 160 is separated from the third segment 162 by two dots ('..'), the third segment 162 is separated from the fourth segment 166 by two dots ('..'), and the fourth segment 166 is separated from the fifth segment 170 by two dots ('..'). It is understood that distinctive delimiters other than double dots ('..') may also be used in some embodiments to demark the separation of segments of the filename.

Each of the fields or segments 158, 160, 162, 166, 170 may comprise from one character up to a maximum number of characters. Different fields or segments 158, 160, 162, 166, 170 may be associated with a different maximum number of characters. For example, the first field or segment 158 may be associated with a maximum of 255 characters, and the second field or segment 160 may be associated with a maximum of 10,500 characters. Characters may be referred to as symbols in some context. Characters may be lowercase alphabetic characters, uppercase alphabetic characters, numerals, special characters such as exclamation mark (!), the number sign (#), an asterisk (*), or other special characters. Some characters may be deemed invalid in one or more of the fields or segments 158, 160, 162, 166, or 170. Characters may comprise American standard code for information interchange (ASCII) characters. Characters may comprise extended binary coded decimal interchange code (EBCDIC) characters.

The multi-segment filenames 122 illustrated in FIG. 1 may be formatted in accordance with any of the multi-segment filename formats 156, 164, or 168. The multi-segment filenames 122 illustrated in FIG. 1 may not all be of the same multi-segment filename format 156, 164, or 168. For example, the first multi-segment filename 122A may be formatted in accordance with the third multi-segment filename format 168, the second multi-segment filename 122b may be formatted in accordance with the first multi-segment filename format 156, and the third multi-segment filename 122c may be formatted in accordance with the second multi-segment filename format 164. While multi-segment filename formats having three segments, four segments, and five segments have been illustrated, it is contemplated that the teachings of the present disclosure may advantageously be used in multi-segment filename formats comprising two segments and comprising six or more segments. For further details on multi-segment filenames, see U.S. patent application Ser. No. 16/789,008, filed Feb. 12, 2020, and entitled "Use of Semantically Segmented Filenames" by Lyle W. Paczkowski et al., which is incorporated by reference herein in its entirety.

Figure 5A:
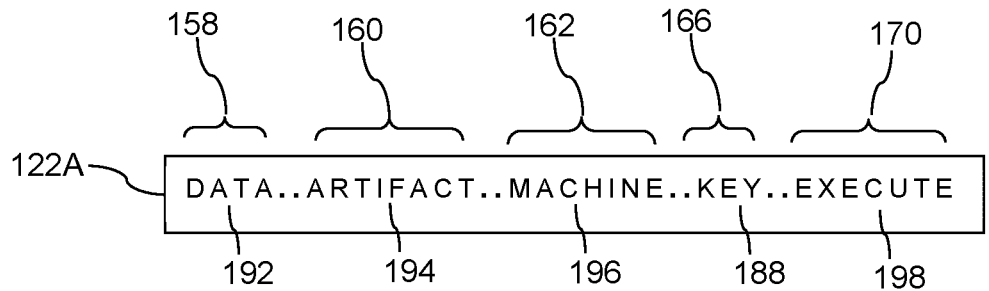
FIG. 5A is an illustration of another multi-partition filename format according to an embodiment of the disclosure.

Turning now to FIG. 5A with reference to FIG. 1, an application 104 on a local computer 102 can create a multi-segment filename 122A configured to recreate slice 146 with the same structure, applications, and data. A multi-segment filename 122A is shown illustrated with multi-segment filename format 168, as illustrated in FIG. 4C. The multi-segment filename 122A can be formatted with five segments containing plain text content, plain text instructions, or file locations. The file locations can contain the location of a data file, one or more executable files, an encryption key, and a list of one or more artifacts. The plain text content can consist of an encryption key, a file location, a list of artifacts, and a message. The plain text instructions can consist of machine code instructions, machine code executable, executable code, machine commands, machine instructions, or machine kernel. For example, an application 104 can save machine code instructions for the creation of a slice 146 configured to operate on NFV 110. The machine code instructions can include the configuration of VNF 172, VNF 176, and unallocated portion 180 for operation on slice 146. The machine code instructions may be written for the creation of slice 146 specifically for NFV 110 or written for the creation of the slice 146 on any suitable NFV (e.g., 114). Turning back to FIG. 5A, the data or the data filename 193 can be placed in the first segment 158. A list of artifacts 194 or an artifact filename can be placed in the second segment 160. Machine code 196 containing the organization of the slice 146 can be placed in the third segment 162. An encryption key 188 (e.g., a password) or encryption key filename can be placed in a fourth segment 166. One or more executables (e.g., 174A & 178A) or an executable filename 198 can be placed in the fifth segment 170. Although plain text content, plain text instructions, or a file name is illustrated as assigned to a specific segment, the plain text content, plain text instructions, or a file name could be assigned any segment 158, 160, 162, 166, or 170 and in any order. Although the multi-segment filename 122A is shown formatted with multi-segment filename format 168, the multi-segment filename 122A can be formatted in accordance with any of the multi-segment filename formats 156, 164, or 168. The multi-segment filename 122A, with the content assigned to each segment, can create the slice 146 located on NFV 110 or any other NFV.

Figure 5B:
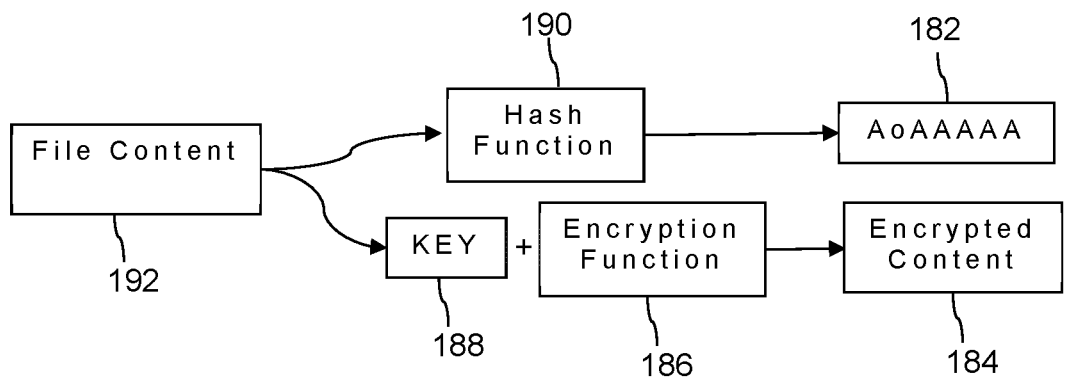
FIG. 5B is a logical flow diagram of a system according to an embodiment of the disclosure.

Turning now to FIG. 5B, a method of encrypting files and storing files with a unique identifier, is described. A computer file may consist of a file name associated with the contents of the file or file contents 192. An application 104 may use a hash of a file content 192 as a filename and encrypt the file contents with an encryption key 188. File content 192 may be hashed with a hash function 190 that may be part of application 104 or a separate application executing on local computer 102. A hash function 190 can produce a hash (hash filename 182), which is a fixed-length character string (e.g., 64 characters of text) from any size of an input file or text string. The hash filename 182 is illustrated with seven characters: "AoAAAAA" where the "Ao" identifies the type of hash function used, and the remaining five characters illustrate the fixed-length character field. Hash functions 190 produce a unique fixed-length character string from any line of text, a text message, an entire book, a picture, or a video. The hash (hash filename 182) of the file contents does not replace the contents of the file but represents the file with a unique identifier (hash filename 182). The unique character string can't be decrypted. Said another way, the original file can't be reconstructed from the unique character string. Hash functions are well-known encryption methods (e.g., SHA256, MD5, Bcrypt, and RIPEMD). The application 104 can encrypt the file content 192 with an encryption key 188 using an encryption function 186. The encryption function 186 may be part of application 104 or a separate application executing on local computer 102. The encryption function 186 produces the encrypted content 184 from the file content 192 and encryption key 188. The file content 192 can now be securely saved as the encrypted content 184 with the hash filename 182 as the file name.

Figure 5C:
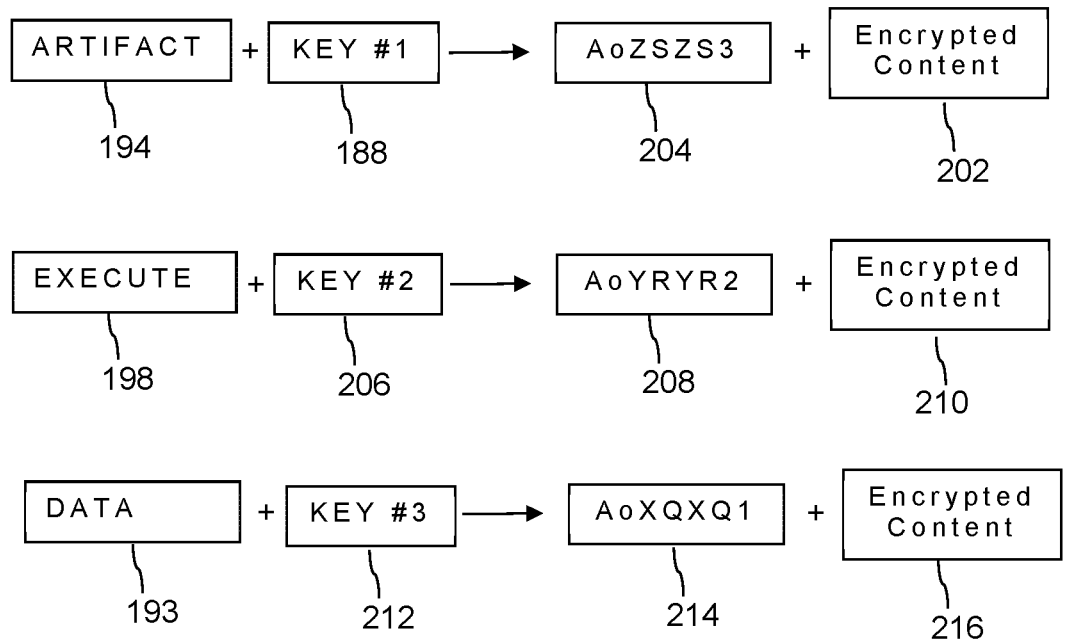
FIG. 5C is multiple examples of a logical flow diagram of a system according to an embodiment of the disclosure.

Turning now to FIG. 5C, three examples are described. A list of artifacts 194 can be encrypted with the encryption function 186 and a first encryption key 188 to produce encrypted artifact content 202. The list of artifacts 194 can be submitted to the hash function 190 to produce an artifact hash identifier 204 (e.g., AoZSZS3). The encrypted artifact content 202 with the artifact hash identifier 204 (e.g., AoZSZS3) used as a filename can be stored in remote data storage 112. One or more executables 198 (e.g., application 174A and 178A) can be encrypted with the encryption function 186 and a second encryption key 206 to produce encrypted executable content 210. The one or more executables 198 can be submitted to the hash function 190 to produce an executable hash identifier 208 (e.g., AoYRYR2). The encrypted executable content 210 with the executable hash identifier 208 (e.g., AoYRYR2) used as a filename can be stored in remote data storage 112. A data file 192 can be encrypted with the encryption function 186 and a third encryption key 212 to produce encrypted data content 216. The data file 193 can be submitted to the hash function 190 to produce a data hash identifier 214 (e.g., AoXQXQ1). The encrypted data content 216 with the data hash identifier 214 (e.g., AoXQXQ1) used as a filename can be stored in remote data storage 112.

Figure 6:
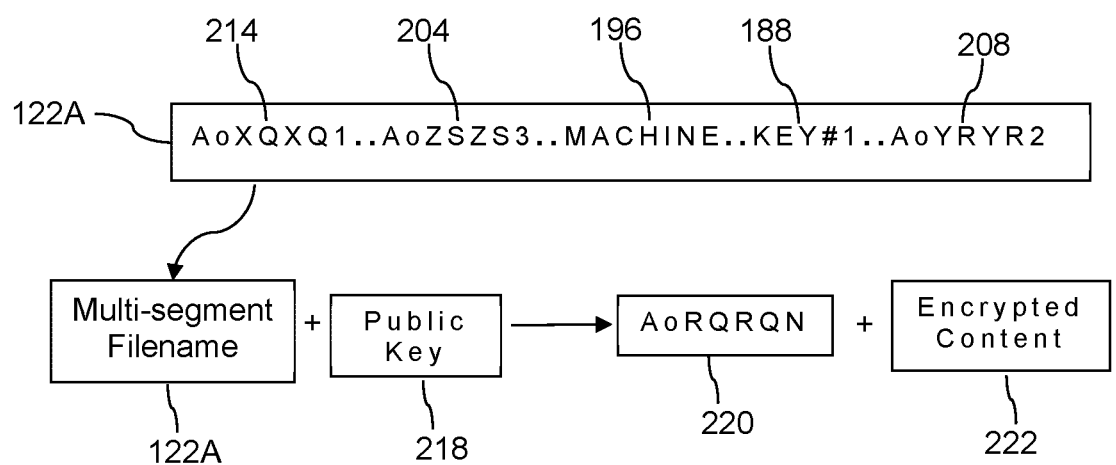
FIG. 6 is a logical flow diagram of a system according to an embodiment of the disclosure.

Turning now to FIG. 6, the application 104 on local computer 102 can configure the multi-segment filename 122A with hash identifiers and plain text in various file segments. In the example shown, the first segment can contain data hash identifier 214. The second segment can include artifact hash identifier 204. The third segment can include machine code 196 written in plain text consisting of the organization of the VNFs and slice. The machine code 196 may not be encrypted or hashed. The fourth segment can contain a first encryption key 188 written in plain text and not encrypted. The fifth segment can contain the executable hash identifier 208. The multi-segment filename 122A can be encrypted with the encryption function 186 and public encryption key 218 to produce encrypted filename content 222. The public encryption key 218 may be shared by various computers, networks, or companies associated with the local computer 102. The term "public key" indicates that the key can be shared among designated devices, but not published or available to the public. The multi-segment filename 122A can be submitted to the hash function 190 to produce a filename hash identifier 220 (e.g., AoRQRQN). The encrypted filename content 222 with the filename hashed identifier 220 (e.g., AoRQRQN) used as a filename can be stored in remote data storage 112.

In an embodiment, the local mobile carrier can create multi-segment filename 122A from slice 146 on NFV 110 with application 104 on local computer 102. The local mobile carrier can remove slice 146 from NFV 110. In an embodiment, the local mobile carrier can create slice 146 on NFV 110 from multi-segment filename 122A.

In an embodiment, the local mobile carrier can transfer a slice 146 from NFV 110 to a remote mobile carrier. Returning to FIG. 1, an application 104 executing on a local computer 102 can create multi-segment filename 122A from slice 146 on NFV 110. The local mobile carrier can remove slice 146 from NFV 110, or the slice 146 can remain functioning on NFV 110. The application 104 can encrypt the multi-segment filename 122A into encrypted filename content 222 with the filename hash identifier 220 (e.g., AoRQRQN). The filename hash identifier 220 can be transferred to the remote mobile carrier by email, thumb drive, or transferred through the network 108. The remote mobile carrier can store the filename hash identifier 220 on the remote computer 116. An application 120 executing on remote computer 116 can communicatively connect to remote data storage 112 via the network 108 to request the encrypted filename content 222 with the same filename as the filename hash identifier 220. The remote computer 116 of the remote mobile carrier may have a public encryption key 218 (e.g., designated device). The application 120 may decrypt the encrypted filename content 222 with the public encryption key to produce multi-segmented filename 122A.

In an embodiment, the local mobile carrier can grant tiered access to the multi-segment filename 122A and encrypted file content based on the number of keys given with the filename hash identifier 220. For example, someone unauthorized (e.g., hacker) could not gain access to the filename hash identifier 220 if they did not have the public encryption key 218. A high-security transfer can be performed by only providing a mobile carrier the filename hash identifier 220. The mobile carrier would have to decrypt the encrypted filename content 222 with the public encryption key 218 before they could request the first encryption key (e.g., key-#1 118). A "red flag" or high-risk rating would be given if the mobile carrier requested the public encryption key 218. The lack of a public encryption key 218 would indicate the remote mobile carrier is not a designated network or designated device. A medium-security transfer can be performed by providing a mobile carrier the hashed filename and embedding an additional encryption key within the multi-segment filename 122A. In the example shown in FIG. 6, the first encryption key, key-#1 188, can be embedded in one of the file segments of the multi-segment filename 122A. Providing an additional key can speed up the configuration process of establishing slice 152. A low-security transfer can be performed by providing two or more keys within the multi-segment filename 122A or providing the keys along with the multi-segment filename 122A. For example, if the local carrier network wanted to configure the slice 146 on another network, owned by the local carrier, across town or on the other side of the country. The multi-segment filename 122A can be transferred with key-#1 188, key-#2 206, and key-#3 212.

Returning to FIG. 1, the remote carrier can configure slice 152 on NFV 114 to mirror the configuration of slice 146 on NFV 110 with the multi-segment filename 122A. After decrypting encrypted filename content 222 with the public encryption key 218 to reveal the multi-segment filename 122A, the application 120 may request the encrypted content 202 matching artifact hash identifier 204, executable hash identifier 208, and data hash identifier 214 from the remote data storage 112. The application 120 may communicatively connect to the NFV 114 via network 108 and submit the machine code 196 that was not encrypted to the operating system 118 executing on remote computer 116 to configure slice 152. The slice 152 may be configured to mirror the configuration of slice 146, as illustrated in FIG. 3A and FIG. 3B. The application 120 can extract the first encryption key, key-#1 188, from segment 166 of the multi-segment filename 122A. The application 120 can submit the first encryption key, key-#1 188, and encrypted content 202 to an encryption function to decrypt a list of artifacts 194. The application 120 can request the artifacts from local computer 102 and submit them to the slice 152.

In an embodiment, one or more segments of the multi-segment file name 168 may be empty or contain a value that the application 104 recognizes as "null" or empty. For example, a multi-segment file 168 may have a "null" in segment 158, a "null" in segment 160, machine code 196 in segment 162, a "null" in segment 166, and a "null" in segment 170. The application 104 may recognize the "null" and ignore the sections with a "null" and perform the function in the segments without the "null." In this example, the application 104 may read the "null" sections and configure the slice 146 or slice 152 per the machine code 196 in segment 162.

In an embodiment, one or more of the keys can be obtained from another computer. For example, the third encryption key, key #3 212, for the data can be obtained from a remote computer, for example, from the customer. In an embodiment, one segment of the multi-segment filename can be obtained from another computer. For example, the data file 193 can be obtained from the customer or from another source.

Figure 7:
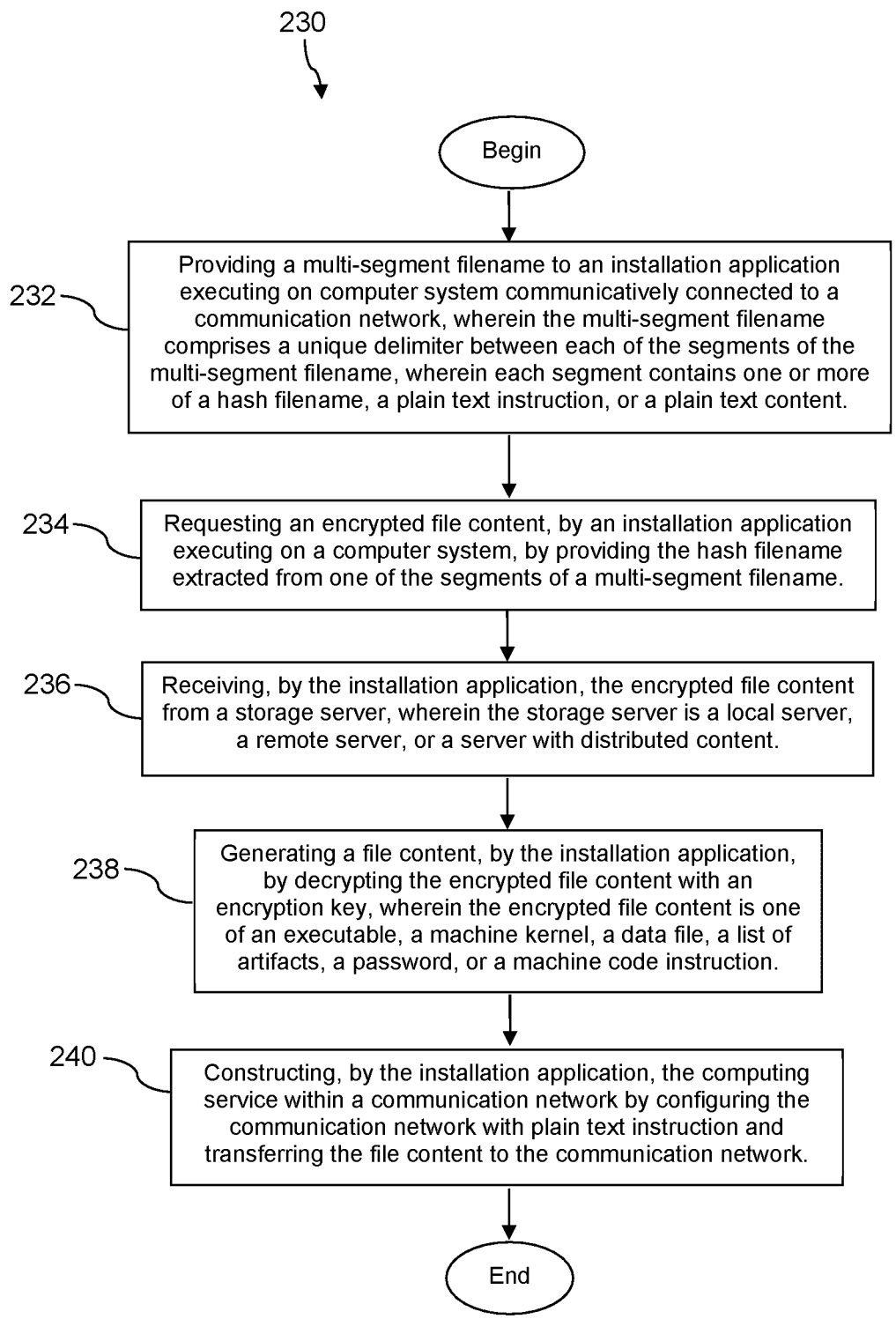
FIG. 7 is a flow chart of a method according to an embodiment of the disclosure.

Turning now to FIG. 7, a method 230 is described. In an embodiment, the method 230 is a method of configuring a computing service on a communication network. At block 232, the method 230 comprises providing a multi-segment filename to an installation application executing on computer system communicatively connected to a communication network, wherein the multi-segment filename comprises a unique delimiter between each of the segments of the multi-segment filename, wherein each segment contains one or more of a hash filename, a plain text instruction, or a plain text content.

At block 234, the method 230 comprises requesting an encrypted file content, by an installation application executing on a computer system, by providing the hash filename extracted from one of the segments of a multi-segment filename. At block 236, the method 230 comprises receiving, by the installation application, the encrypted file content from a storage server, wherein the storage server is a local server, a remote server, or a server with distributed content. At block 238, the method 230 comprises generating a file content, by the installation application, by decrypting the encrypted file content with an encryption key, wherein the encrypted file content is one of an executable, a machine kernel, a data file, a list of artifacts, a password, or a machine code instruction.

At block 240, the method 230 comprises constructing, by the installation application, the computing service within a communication network by configuring the communication network with plain text instruction and transferring the file content to the communication network.

Figure 8:
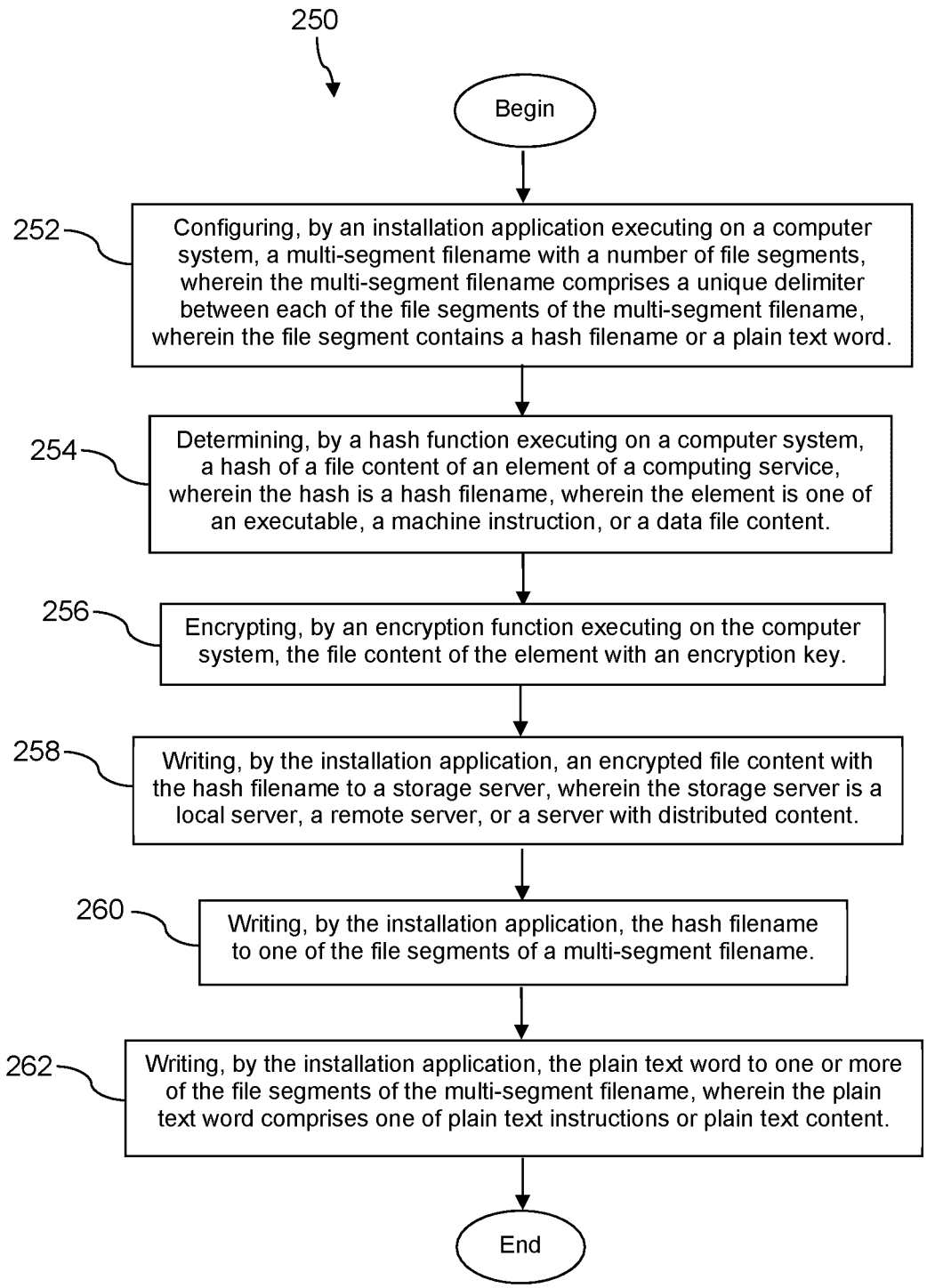
FIG. 8 is a flow chart of another method according to an embodiment of the disclosure.

Turning now to FIG. 8, a method 250 is described. In an embodiment, the method 250 is a method of storing a configuration of a computing service configured to operate on a portion of a network. At block 252, the method 250 comprises configuring, by an application executing on a computer system, a multi-segment filename with a number of file segments, wherein the multi-segment filename comprises a unique delimiter between each of the file segments of the multi-segment filename, wherein the file segment contains a hash filename or a plain text word.

At block 254, the method 250 comprises determining, by a hash function executing on a computer system, a hash of a file content of an element of a computing service, wherein the hash is a hash filename, wherein the element is one of an executable, a machine instruction, or a data file content. At block 256, the method 250 comprises encrypting, by an encryption function executing on the computer system, the file content of the element with an encryption key. At block 258, the method 250 comprises writing, by the application, an encrypted file content with the hash filename to a storage server, wherein the storage server is a local server, a remote server, or a server with distributed content. At block 260, the method 250 comprises writing, by the application, the hash filename to one of the file segments of a multi-segment filename.

At block 262, the method 250 comprises writing, by the application, the plain text word to one or more of the file segments of the multi-segment filename, wherein the plain text word comprises one of a plain text instruction or a plain text content.

Figure 9A:
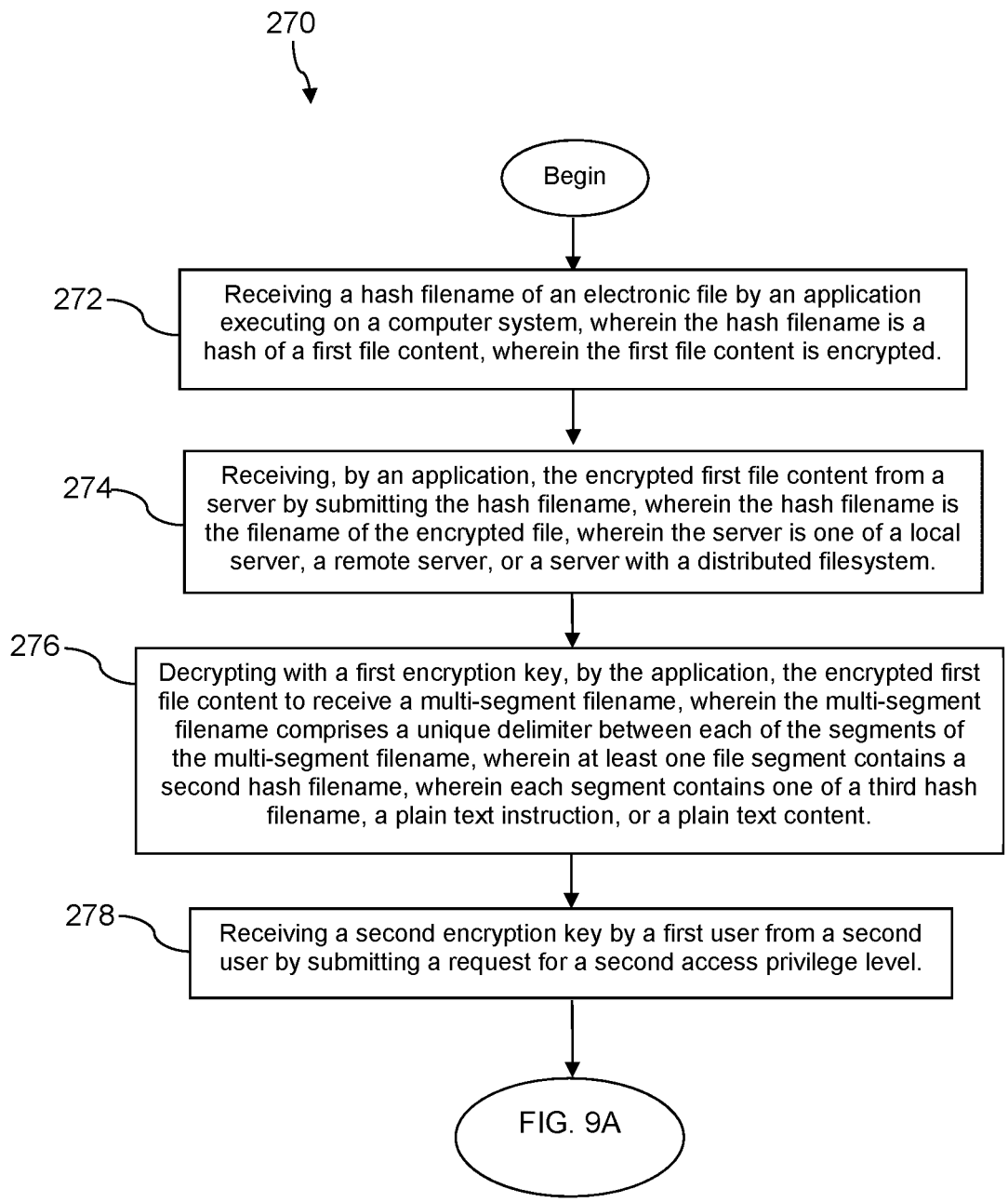
FIG. 9A is a flow chart of yet another method according to an embodiment of the disclosure.
Figure 9B:
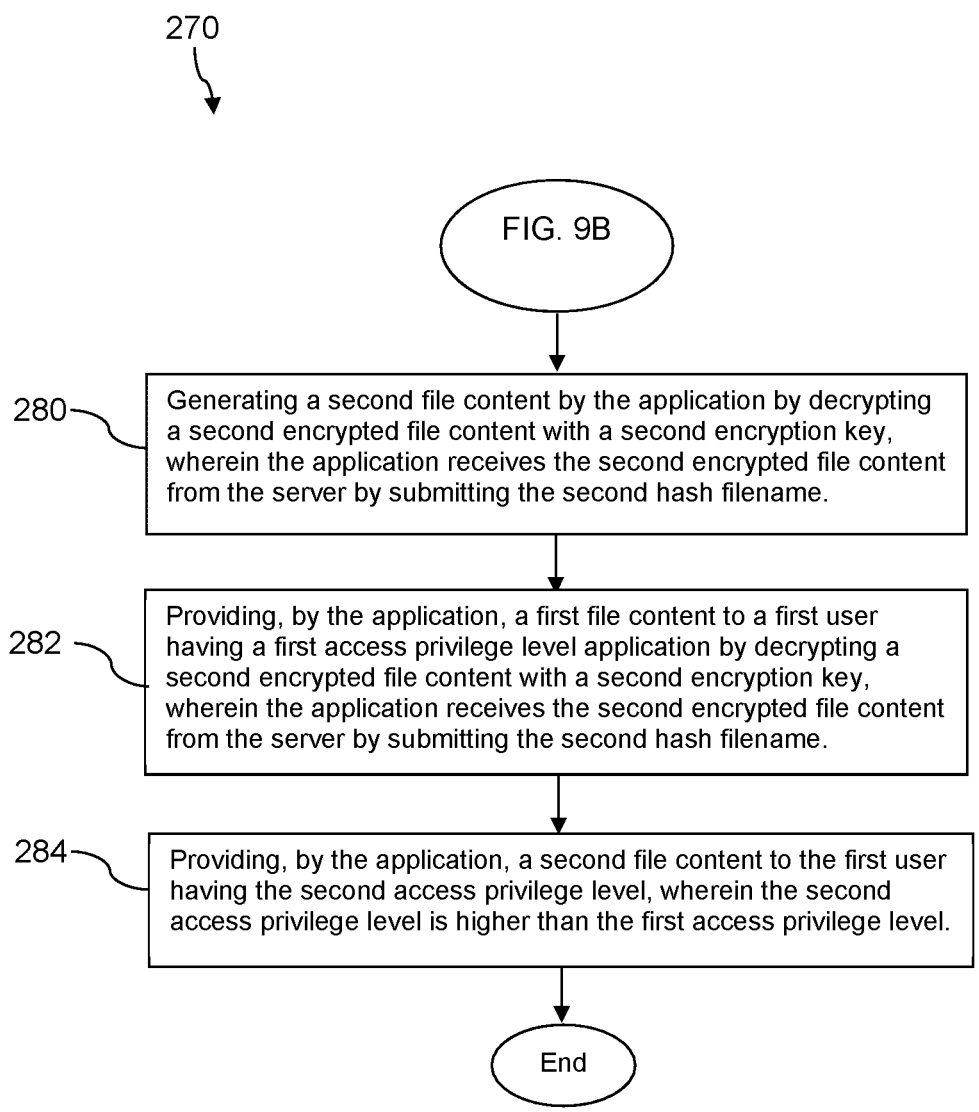
FIG. 9B is a continuation of a flow chart of yet another method according to an embodiment of the disclosure.

Turning now to FIG. 9, a method 270 is described. In an embodiment, the method 270 is a method of managing multi-privilege layer access to confidential information imbedded in filenames of electronic files. At block 272, the method 270 comprises receiving a hash filename of an electronic file by an application executing on a computer system, wherein the hash filename is a hash of a first file content, wherein the first file content is encrypted.

At block 274, the method 270 comprises receiving, by an application, the encrypted first file content from a server by submitting the hash filename, wherein the hash filename is the filename of the encrypted first file content, wherein the server is one of a local server, a remote server, or a server with a distributed filesystem.

At block 276, the method 270 comprises decrypting with a first encryption key, by the application, the encrypted first file content to receive a multi-segment filename, wherein the multi-segment filename comprises a unique delimiter between each of the segments of the multi-segment filename, wherein at least one file segment contains a second hash filename, wherein each segment contains one of a third hash filename, a plain text instruction, or a plain text content.

At block 278, the method 270 comprises receiving a second encryption key by a first user from a second user by submitting a request for a second access privilege level. At block 280, the method 270 comprises generating a second file content by the application by decrypting a second encrypted file content with a second encryption key, wherein the application receives the second encrypted file content from the server by submitting the second hash filename. At block 282, the method 270 comprises providing, by the application, a first file content to a first user having a first access privilege level.

At block 284, the method 270 comprises providing, by the application, a second file content to the first user having a second access privilege level, wherein the second access privilege level is higher than the first access privilege level.

Figure 10:
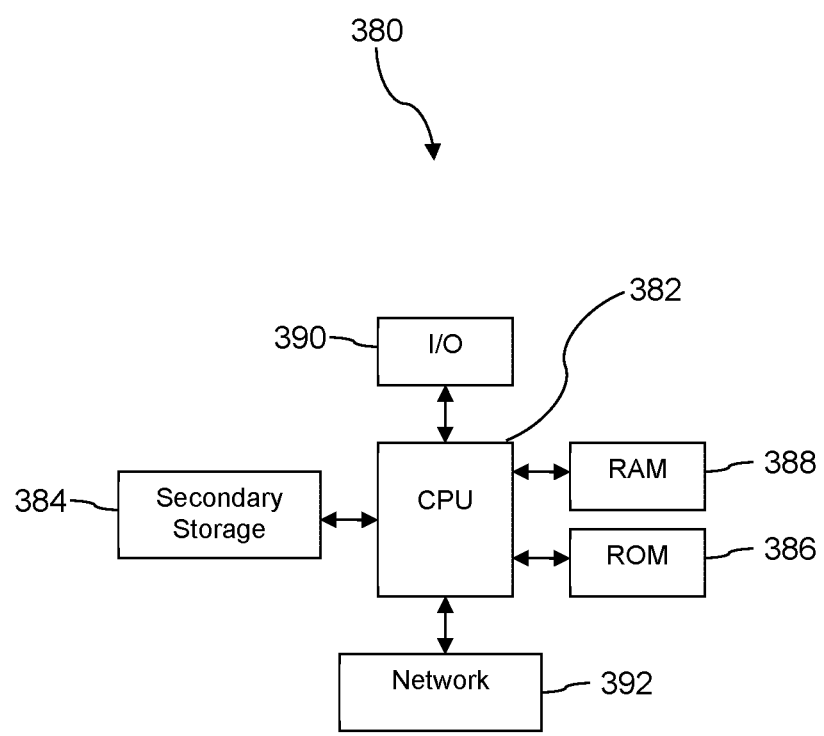
FIG. 10 is a block diagram of a computer system according to an embodiment of the disclosure.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read-only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example, in an application-specific integrated circuit (ASIC), because for large production runs the hardware implementation may be less expensive than the software implementation. Often a design may be developed and tested in a software form and later transformed, by well-known design rules, to an equivalent hardware implementation in an application-specific integrated circuit that hardwires the instructions of the software. In the same manner, as a machine controlled by a new ASIC is a particular machine or apparatus, likewise, a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer-readable storage media and/or non-transitory computer-readable media.

I/O devices 390 may include printers, video monitors, liquid crystal displays (LCDs), touch screen displays, keyboards, keypads, switches, dials, mice, trackballs, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), or radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using the processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, and scripts which it accesses from a hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other devices, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer-readable storage medium having computer-usable program code embodied therein to implement the functionality disclosed above. The computer program product may comprise data structures, executable instructions, and other computer usable program code. The computer program product may be embodied in removable computer storage media and/or non-removable computer storage media. The removable computer-readable storage medium may comprise, without limitation, a paper tape, a magnetic tape, magnetic disk, an optical disk, a solid-state memory chip, for example, analog magnetic tape, compact disk read-only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example, by reading from a CD-ROM disk inserted into a disk drive peripheral of the computer system 380. Alternatively, the processor 382 may process the executable instructions and/or data structures by remotely accessing the computer program product, for example, by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer-readable medium or a computer-readable storage media. A dynamic RAM embodiment of the RAM 388, likewise, may be referred to as a non-transitory computer-readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer-readable media or computer-readable storage media.

Figure 11:
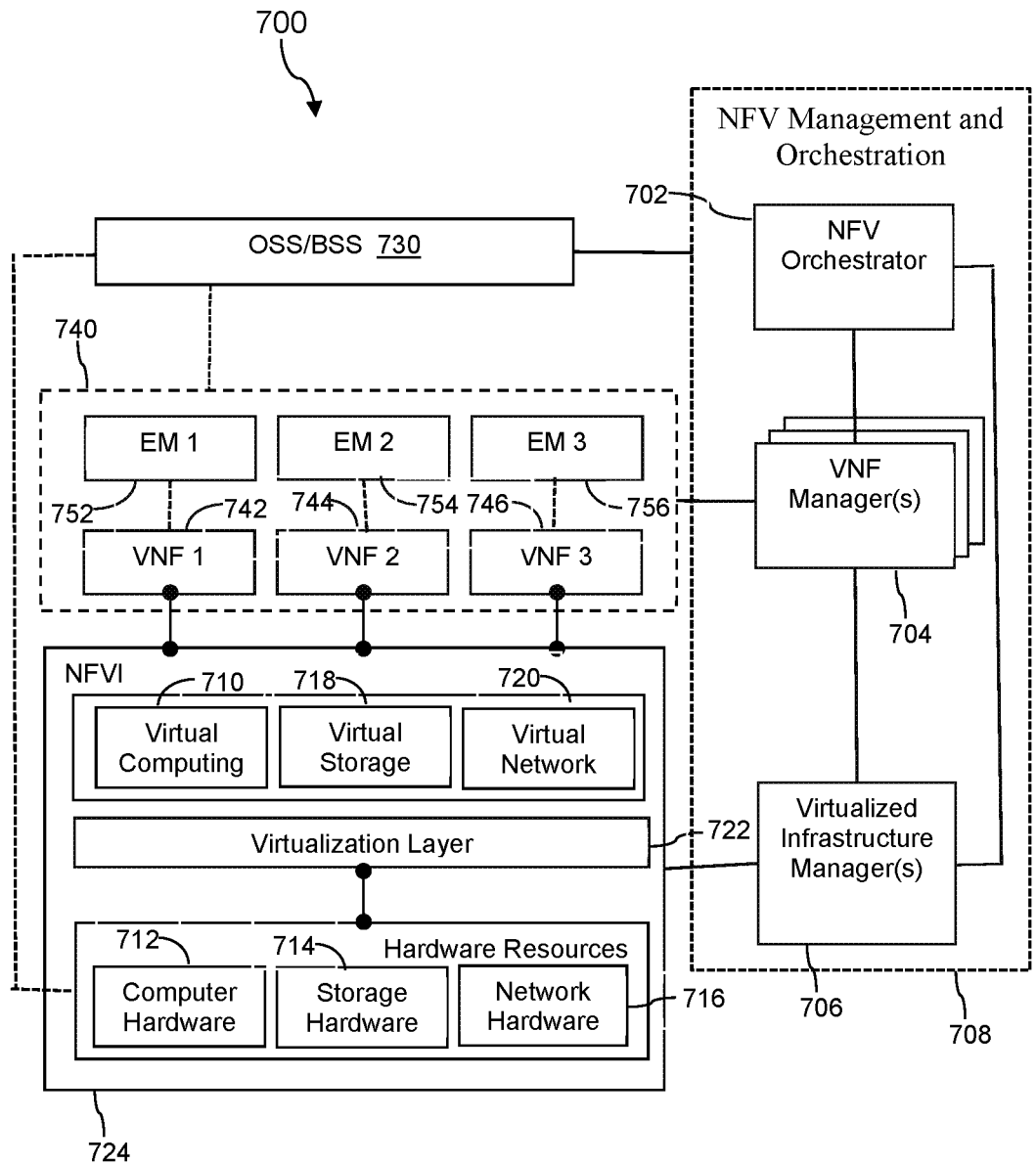
FIG. 11 is a block diagram of a virtual function network according to an embodiment of the disclosure.

FIG. 11 illustrates an NFV system 700 for use in various embodiments of the disclosed systems and methods. NFV system architecture is well understood and described in Network Functions Virtualization (NFV); Architectural Framework ETSI GS NFV 002 V1.2.1 (2014-12), which is incorporated into this description. The NFV system 700 can comprise an NFV Infrastructure (NFVI) entity 724, a virtual function entity 740, NFV Management and Orchestration 708, and an Operations Support Systems (OSS) and Business Support Systems (BSS) generally referred to as OSS/BSS 730 suitable for implementing one or more embodiments disclosed herein.

The NFVI 724 is the hardware and software components that comprise the environment in which VNFs (e.g., VNF 742, 744, and 746) are deployed, managed, and executed. The NFVI 724 can be located in one location or can be communicatively connected to multiple locations. For example, the NFVI 724 can be located on several floors of a building or across several buildings on campus. The network providing connectivity between those locations comprises part of the NFV Infrastructure. The NFVI 724 includes off-the-shelf (OTS) hardware resources of computing hardware 712, storage hardware 714, and network hardware 716. The computing hardware 712 can be OTS instead of purpose-built hardware. The storage hardware 714 can comprise network attached storage (NAS) and storage that resides on the computing hardware 712. The storage hardware 714 can include standard hard-drives, solid-state drives, optical storage devices, or any combination thereof. Network hardware 716 is comprised of switching functions, e.g., routers, and wired or wireless links. Network hardware 716 can also provide resources that span different domains. In NFVI 724, the computing hardware 712, storage hardware 714, and network hardware 716 are pooled together through the virtualization layer 722 (e.g., hypervisor).

The virtualization layer 722 within the NFVI 724 can abstract the computing hardware 712, storage hardware 714, and network hardware 716 and decouple the VNF functions 742, 744, and 746 from the computer hardware 712, storage hardware 714, and network hardware 716. For example, the virtualization layer 722 may be responsible for abstracting and logically partitioning computer the computing hardware 712, storage hardware 714, and network hardware 716, enabling the software that implements the VNF functions to use the underlying virtualized infrastructure, and providing virtualized resources to each of the VNF functions 742, 744, and 746. The virtualized resources controlled by the virtualization layer 722 may include a virtual computing 710, a virtual storage 718, and a virtual network 720.

The NFV Management and Orchestration 708 can manage the operation and coordination of VNF function 742, 744, and 746 and the respective NFVI entity 724. The NFV Management and Orchestration 708 can comprise an NFV Orchestrator (NFVO) 702, one or more VNF managers (VNFM) 704, and one or more Virtualized Infrastructure Manager (VIM) 706. The NFVO 702 can manage the network service (NS) lifecycle and coordinates the management of the NS lifecycle, VNF lifecycle through the VNFM 704, and NFVI resources through the VIM 706. The NFVO 702 operates to ensure the allocation of the necessary resources and connectivity for the VNF functions 742, 744, and 746 is optimized. The VNFM 704 can coordinate the VNF function 742, 744, and 746 lifecycle management (e.g., initiation, update, scaling, and termination). For example, in some configurations a separate VNFM 704 may be deployed for each VNF function 742, 744, and 746. In other configurations, a VNFM 704 may serve multiple VNF functions 742, 744, and 746. The VIM 706 can control and manage the NFVI 724 hardware resources. In other words, the VIM 706 can control and manage the virtualization layer 722 to provide virtual computing 710, virtual storage 718, and virtual network 720 resources to the VNF functions 742, 744, and 746 from the computer hardware 712, storage hardware 714, and network hardware 716. The VIM 706 and the VNFM 704 may coordinate to provide the resource allocation to the VNF functions 742, 744, and 746 by modifying the virtualized hardware resource configuration and state information.

The OSS/BSS 730 can coordinate the communication between NFV management and orchestration 708, NFVI 724, and virtual function entity 740. The OSS/BSS 730 can communicate the computing capacity of the NFVI 724 to VNFM 704 and VIM 706 within NFV management and orchestration 708. The OSS/BSS can coordinate the lifecycle management of the VNF functions 742, 744, and 746 with the NFVI 724 and the VNFM 704.

The virtual function entity 740 can comprise a plurality of VNF functions 742, 744, and 746, a plurality of element management (EM) systems 752, 754, and 756 that can be configured to perform the typical management functionality for the plurality of VNF functions 742, 744, and 746. Although three VNF and EMS systems are illustrated in FIG. 10, any number of these functions and systems may be found virtual function entity 740. It is also understood that alternate configurations of the VNF functions and element management systems may be contemplated within ETSI GS NFV 002 V1.2.1 (2014-12).

The VNF functions 742, 744, and 746 can be a virtualization of a network function in a non-virtualized network. For example, the network functions in the non-virtualized network may be 3GPP Evolved Packet Core (EPC) network elements, e.g., Mobility Management Entity (MME), Serving Gateway (SGW), Packet Data Network Gateway (PGW); elements in a home network, e.g., Residential Gateway (RGW); and conventional network functions, e.g., Dynamic Host Configuration Protocol (DHCP) servers, firewalls, etc. For example, NFV 700 can be comprised of one or more internal components, called virtualized network function components (VNFCs). Each VNFC provides a defined sub-set of that VNF's functionality, with the main characteristic that a single instance of this component maps one-for-one against a single virtualization container. For example, one VNF can be deployed over multiple Virtual Machines (VMs), where each VM hosts a VNFC of the VNF. However, in some cases, the whole VNF can be deployed in a single VM as well. A VM may be virtualized computation environment that behaves like a physical computer or server, which has all its ingredients (processor, memory/storage, interfaces/ports) of a physical computer/server and is generated by a hypervisor, which partitions the underlying physical resources and allocates them to VMs. A hypervisor may be a piece of software which partitions the underlying physical resources and creates virtual machines and isolates the virtual machines from each other.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of configuring a computing service on a communication network, comprising:
   creating and providing a multi-segment filename by a local mobile carrier to a remote mobile carrier;
   receiving the multi-segment filename by an installation application executing on computer system communicatively connected to a communication network, wherein the multi-segment filename comprises a unique delimiter between each segment of the multi-segment filename, and wherein a first segment of the multi-segment filename comprises one or more of a hash filename, a second segment of the multi-segment filename comprises a plain text instruction, and a third segment of the multi-segment filename comprises a plain text content;
   requesting an encrypted file content, by the installation application, by providing the hash filename extracted from one segment of the multi-segment filename;
   receiving, by the installation application, the encrypted file content from a storage server, wherein the storage server is a local server, a remote server, or a server with distributed content;
   generating a file content, by the installation application, by decrypting the encrypted file content with an encryption key; and
   constructing, by the installation application, the computing service within a communication network by configuring the communication network with the plain text instruction from the second segment of the multi-segment filename and transferring the file content to the communication network, wherein the multi-segment file name is used by the remote mobile carrier to recreate a network slice and a virtual network function environment for the computing service to execute on a remote mobile carrier network of the remote mobile carrier.

2. The method of claim 1, further comprising:
   executing, by the installation application, the plain text instruction from the second segment of the multi-segment filename; wherein the plain text instruction comprises machine code; and wherein the machine code comprises instructions creating the network slice.

3. The method of claim 1, further comprising:
   configuring, by the installation application, one or more network elements on a virtual network of the second mobile carrier for one or more computing service applications from the plain text instruction.

4. The method of claim 1, further comprising:
   reading, by the installation application, the plain text content from the third segment of the multi-segment filename; and wherein the plain text content is one of the hash filename, an encryption key, a list of artifacts, a file location, or a set of data.

5. The method of claim 1, further comprising:
   receiving a request to execute a file identified by the multi-segment filename along with a first plain text instructions; and
   invoking the first plain text instructions identified by the multi-segment filename for an execution parameter.

6. The method of claim 1, wherein the plain text content comprises one of a second encryption key, the list of artifacts, or a data file content.

7. The method of claim 1, wherein the plain text instruction comprises machine code of an executable for a computing service application.

8. The method of claim 1, wherein the installation application is a user application of the computer system.

9. The method of claim 1, wherein the multi-segment filename comprises at least three segments.

10. The method of claim 1, wherein the local mobile carrier grants tiered access to the multi-segment file name and the encrypted file content based on a plurality of encryption keys.

11. The method of claim 1, wherein the encrypted file content comprises one of an executable, a machine kernel, a data file, a list of artifacts, a password, or a machine code instruction.

12. A method of storing a configuration of a computing service configured to operate on a portion of a network, comprising:
   configuring, by an installation application executing on a computer system, a multi-segment filename with a number of file segments, wherein the multi-segment filename comprises a unique delimiter between each file segment of the multi-segment filename, and wherein a first segment of the multi-segment filename comprises a hash filename and a second segment of the multi-segment filename comprises a plain text word;
   determining, by a hash function executing on the computer system, the hash filename by determining a hash of a file content of an element of the computing service;
   encrypting, by an encryption function executing on the computer system, the file content of the element with an encryption key;
   writing, by the installation application, the encrypted file content with the hash filename to a storage server, wherein the storage server is a local server, a remote server, or a server with distributed content;

writing, by the installation application, the hash filename to the first segment of a multi-segment filename;

writing, by the installation application, the plain text word to the second segment of the multi-segment filename, wherein the plain text word comprises one of plain text instructions or plain text content; and providing the multi-segment filename from a local mobile carrier to a remote mobile carrier, wherein the remote mobile carrier uses the multi-segment file name to recreate a network slice and a virtual network function environment for the computing service to execute on a remote mobile carrier network of the remote mobile carrier.

13. The method of claim 12, wherein the plain text word comprises the plain text instructions, and wherein the plain text instructions consist of machine code, machine instructions, or machine commands.

14. The method of claim 12, wherein the file content comprises data content, executable code, machine kernel, or list of artifacts.

15. The method of claim 12, wherein the installation application is a user application of the computer system.

16. The method of claim 12, wherein the multi-segment filename comprises at least three segments.

17. The method of claim 12, wherein the plain text word comprises the plain text instructions, and wherein the plain text instructions comprises machine code to organize a network element for a computing service application.

18. The method of claim 12, wherein the element is one of an executable, a machine instruction, or a data file content.

19. The method of claim 12, wherein the local mobile carrier grants tiered access to the multi-segment file name and the encrypted file content based on a plurality of encryption keys.

* * * * *